Nov. 3, 1964 R. D. ORMSBY 3,154,953
GYROSCOPIC CONTROL APPARATUS

Filed Aug. 24, 1961 3 Sheets-Sheet 1

INVENTOR.
RALPH D. ORMSBY
BY
Roger W. Jensen

Nov. 3, 1964   R. D. ORMSBY   3,154,953
GYROSCOPIC CONTROL APPARATUS
Filed Aug. 24, 1961   3 Sheets-Sheet 2

INVENTOR.
RALPH D. ORMSBY
BY
Roger W. Jensen

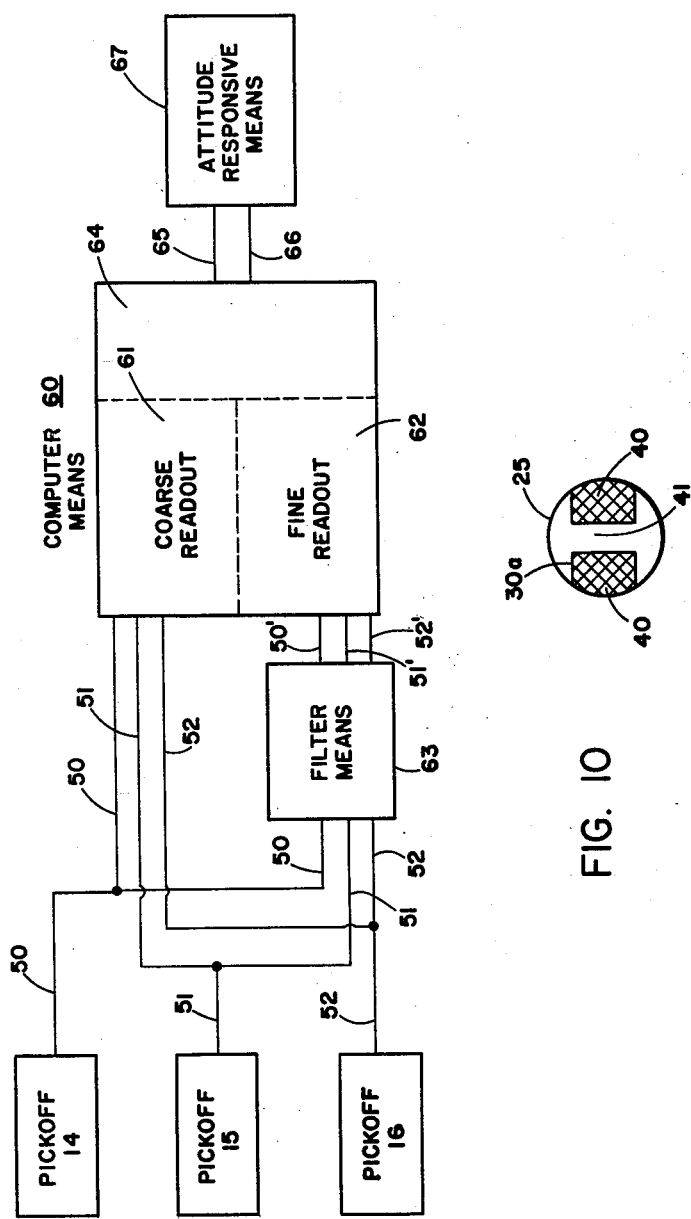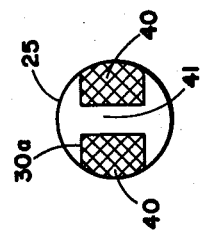

United States Patent Office 3,154,953
Patented Nov. 3, 1964

3,154,953
GYROSCOPIC CONTROL APPARATUS
Ralph D. Ormsby, Ann Arbor, Mich., assignor to
Honeywell Inc., a corporation of Delaware
Filed Aug. 24, 1961, Ser. No. 133,644
9 Claims. (Cl. 74—5.6)

The present invention pertains to apparatus which, in combination with a support member and a spherically shaped rotor universally supported by said support member and adapted to spin relative to the support member about a spin axis, provides for the sensing and measuring of relative rotation between the support member and the rotor member about any axis which is at an angle to the spin axis.

The invention has specific although not exclusive application to the field of gyroscopic instruments comprising in part a spherically shaped rotor element universally supported for rotation about a spin axis by suitable means on a support. The rotor element in spinning about its spin axis will tend to remain fixed in inertial space except when precessional torques are applied thereto. As the support member rotates about any axis at an angle to the spin axis there will be apparent rotational movement between the support member and the rotor.

The present invention provides a unique means for measuring any relative rotation between the spherically shaped rotor member and its supporting means. More specifically the present invention comprises having a plurality of coded latitude lines on the rotor member and pickoff means adapted to coact with the coded latitude lines. The individual latitude lines are coded in the sense that each of the lines has radiative portions and non-radiative portions and the radiative and non-radiative portions are arranged so that each of the lines has a characteristic coding to permit the identification thereof.

In a preferred embodiment three pickoff means orthogonally arranged are adapted to coact with the coded latitude lines on the rotor for producing signals which will be indicative of rotation between the rotor and the support about any axis at an angle to the rotor spin axis.

It is an object of this invention therefore to provide an improved control apparatus.

A more specific object of the invention is to provide a unique pickoff for measuring relative rotation between a universally supported spinning sphere and its support about any axis at an angle to the spin axis.

A further object of the invention is to provide in combination with a spherically shaped spinning rotor and supporting means therefor a pickoff means characterized by comprising a plurality of characteristically coded latitude lines having radiative and non-radiative portions.

Other objects of the invention will be set forth more fully in and become apparent from a reading of the following specification and appended claims in conjunction with the accompanying drawings in which:

FIGURE 9 is a block diagram of the present system; and

FIGURE 10 depicts the relationship between the field of view of one of the pickoff means and a coded latitude line on the rotor element.

Figure 1:
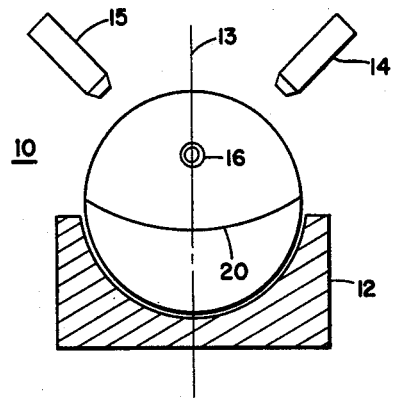
FIGURE 1 is a schematic representation of a gyroscope comprising a rotor element universally supported on a support means and having associated with it three radiation sensor devices or pickoff means orthogonally positioned.
Figure 2:
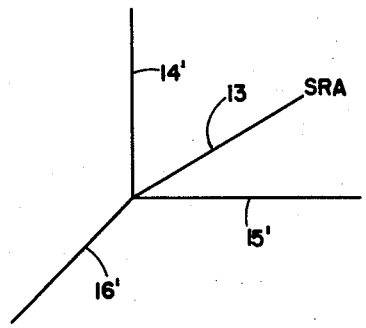
FIGURE 2 is a representation of the sensing axes of the radiation sensors with respect to the spin reference axis of the gyroscope.

Referring to FIGURE 1, a control apparatus is depicted including a gyroscope generally identified by the reference numeral 10 and which comprises a spherically shaped rotor element 11 universally supported relative to a support means 12 by any suitable means well known to those skilled in the art such as an air bearing or the like. The rotor element 11 is adapted to spin about the spin reference axis 13 under the influence of a suitable spinning or rotation impelling means not shown. A plurality of radiation sensors 14, 15 and 16 are positioned by suitable means so as to receive radiation from the rotor element 11. The radiation sensors 14–16 as depicted are orthogonally positioned with respect to each other, this being indicated in FIGURE 2 wherein the axes of sensitivity of the sensors 14–16 are respectively identified by reference numerals 14', 15' and 16'. The relationship between the spin reference axis 13 of the rotor 11 and the pickoff axis 14'–16' is also depicted in FIGURE 2.

Figure 3:
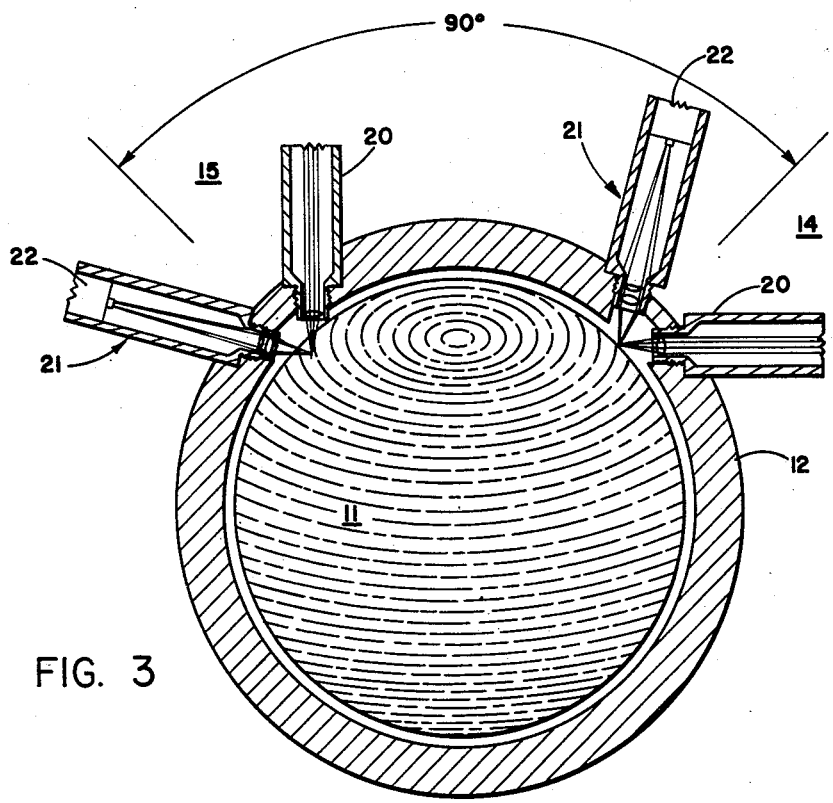
FIGURE 3 is a perspective view of a rotor element universally supported and having a coded latitude line pattern thereon.

In FIGURE 3 the rotor 11 and its supporting means is depicted in somewhat greater detail. As shown the supporting means 12 has a generally hollow spherical form and two of the pickoffs 14 and 15 are also shown. The individual pickoffs or radiation sensors may take various forms well known to those skilled in the art. The specific radiation sensors depicted are light sensing means including a source of light 20 which functions to project a fine point of light on the surface of the spherically shaped rotor 11. The pickoffs also each include a radiation sensor generally designated by the reference numeral 21. Each sensor includes an optical system for receiving radiation (in this form light rays) emanating from the surface of the rotor and causing the radiation to impinge against a signal producing means generally designated by the reference numeral 22. The light producing means 20 and the light sensing means 21 are mounted by a suitable arrangement in the support 12 so that the principal axes thereof converge at the same point on the surface of the rotor 11. A typical field of view of the radiation sensor 21 is depicted in FIGURE 10, the field of view being circular in this case and being identified by the reference numeral 25. It will be understood that light produced by the source of light 20 is sensed by the sensor 21 as a function of the reflectivity of the particular portion of the surface of the rotor 11 being viewed by the sensor 21. As will be well understood by those skilled in the art, the sensors 21 function to produce a signal, usually electrical, which varies as a function of the radiation sensed thereby.

Also shown in FIGURE 3 are a plurality of coded latitude lines 30. In FIGURE 3 the spin reference axis 13 is depicted and the coded latitude lines 30 are defined to be individual lines on the surface of the rotor 11 which correspond to the "equator" of the rotor or lines parallel thereto. The individual lines 30 as depicted encircle the entire rotor element 11. However, it will be understood that the invention contemplates the individual coded latitude lines encircling only a portion of the rotor.

Figure 4:
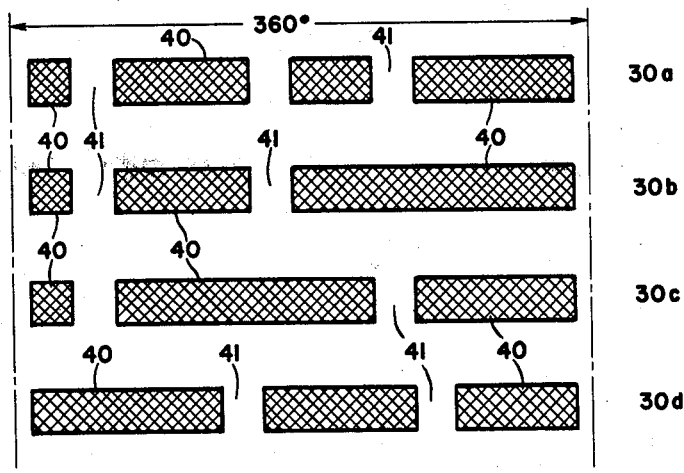
FIGURE 4 is an enlarged view of several adjacent coded latitude lines.
Figure 5:
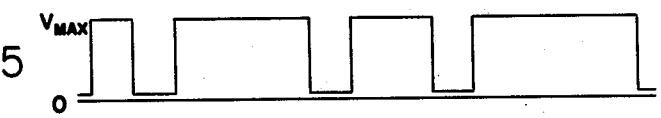
FIGURES 5, 6, 7 and 8 depict output signals from pickoff means coacting with the individual coded latitude lines depicted in FIGURE 4.
Figure 6:
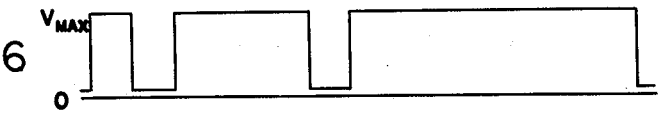
Figure 7:
Figure 8:
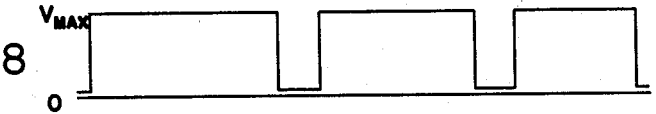

The individual latitude lines 30 are "coded" in the sense that each has its own characteristic arrangement of radiative portions and non-radiative portions so as to permit the identification thereof. The individual coding may be discerned slightly in FIGURE 3. In FIGURE 4 a detailed view of a group of four adjacent lines has been shown. The individual lines in FIGURE 4 are identified by the references 30a, 30b, 30c, and 30d. In FIGURE 4 the individual lines have been placed flat on a plane surface and 360° of rotor surface is shown. The scale used in FIGURE 4 is not intended to be the limiting one but has been used for convenience. It will be noted that the individual latitude lines are depicted spaced from one another, the amount of spacing being selected in accordance with the desired resolution. It will be noted that each of the latitude lines has a plurality of non-radiative portions 40 and a plurality of radiative portions 41. It will be noted that each of the individual lines 30a–30d has a different configuration or arrangement of the radiative portions and non-radiative portions. This gives each of the lines its own characteristic coding so as to permit the identification thereof. As will be well understood by those skilled in the art, the present invention may be used with a great variety of different codes which permit the individual coding.

In FIGURE 10 the relationship between the field of view 25 and a typical coded latitude line 30a is shown. In this arrangement it will be noted that the diameter of the field of view is slightly greater than the height of the latitude line 30a. In FIGURE 10 non-radiaive portions 40 are visibly spaced apart by a radiative portion 41. It will be understood that when the individual pickoffs are viewing a portion which is substantially non-radiative a different signal output will be produced as compared to when a substantially radiative portion is being viewed. This may be better understood by reference to FIGURES 5–8 wherein the output signals corresponding to a pickoff viewing the individual lines 30a through 30d respectively are shown. FIGURES 4 through 8 are arranged with the same position base for convenience. The signal output has arbitrarily been selected so that when the pickoff sensors 21 are viewing non-radiative portions 40 the signal output is at a maximum while when viewing a radiative portion 41 the signal output is at a minimum. It will be understood that this is arbitrary and that the reverse arrangement could well be used. It will be appreciated from reviewing FIGURES 4–8 that the individual output signals corresponding to the sensor means viewing the individual lines 30a–30d are characteristically coded and that each signal output differs from the others.

The system arrangement for the present invention is depicted in block diagram form in FIGURE 9. The three orthogonally located pickoffs 14, 15 and 16 are shown to have outputs 50, 51 and 52 respectively. A computer means generally identified by the reference numeral 60 is provided and may take any suitable form. The details of the computer means 60 are not specifically disclosed herein since they may take a wide variety of configurations according to the particular desired outputs. The computer means 60 has been subdivided into a coarse readout portion 61 and a fine readout portion 62. Outputs 50, 51 and 52 are shown directly connected to the coarse readout section 61. It will be understood that for any relative position between the rotor 11 and support means 12 the outputs from any two of the three pickoffs will define the relative angular position of the spin axis 13 of the rotor relative to the support 12. A third pickoff is provided for the possibility of one of the pickoffs viewing one of the two poles of the rotor. The outputs 50, 51 and 52 are also connected to a suitable filter means 63 which in turn has three outputs 50', 51' and 52' which are connected to the fine readout section 62 of the computer means 60. Filter means 63 may take any suitable form. Its function is to produce an analog signal indicative of the average level of the output signals from the individual pickoffs. As will be understood by viewing FIGURE 10, as there is relative lateral shifting between the field of view 25 and an individual lines, there will be a variation in the magnitude of the output signal. The computer means 60 therefore includes the coarse readout 61 which utilizes the basic identification of the individual coded latitude lines plus a fine readout means 60 for interpolating between lines. The computer means 60 further includes a combining portion 64 for suitably combining the information from the coarse readout and fine readout portions 61 and 62. The computer means has apair of outputs 65 and 66 which may be connected to suitable signal receiving means such as an attitude responsive means 67. One typical application of the present system would be for providing a means of measuring roll and pitch of a craft. The spin reference axis 13 of the rotor 11 could be arranged to be aligned with or parallel to the desired orientation of the craft yaw axis. The system then would function to produce at outputs 65 and 66 information indicative of the roll and pitch attitude of the craft. The attitude responsive means 67 could well be indicating means indicating the roll and pitch deviations or other suitable means such as an autopilot or inertial navigation apparatus.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

One specific point that should be kept in mind in interpreting the following claims are the expressions or terms "radiation" or "radiative." It shall be understood that these terms are used to designate a wide variety of properties in connection with the detecting of the coded lines. In general the invention has been described in connection with a coded line which has light reflective or non-reflective portions, these portions also being generically described as radiative or non-radiative. It will be understood that the invention could also be practiced with surfaces which are either radiative or non-radiative in other senses. For example the individual lines could be coded by having fluorescent and non-fluorescent portions. Another variation would be to use opaque and translucent or transparent coding arrangements. Other arrangements will also occur to those skilled in the art.

I claim:

1. In apparatus of the class described: a support; a spherically shaped rotor universally supported by said support and adapted to be rotated about a spin axis; and means for measuring relative rotation between said rotor and said support about any axis at an angle to said spin axis, said measuring means comprising a plurality of latitude lines on said rotor, each of said lines having radiative portions and non-radiative portions and said radiative portions and non-radiative portions of said lines being arranged about said rotor so that each of said lines has a characteristic coding to permit the identification thereof, and pickoff means adapted to sense radiation from said rotor including means for producing signals indicative of radiation sensed thereby.

2. In apparatus of the class described: a support; a spherically shaped rotor universally supported by said support and adapted to be rotated about a spin axis; and means for measuring relative rotation between said rotor and said support about any axis at an angle to said spin axis, said measuring means comprising a plurality of coded latitude lines on said rotor, each of said lines having a coded arrangement of radiative portions and non-radiative portions to permit the identification thereof, and pickoff means adapted to sense radiation from said rotor including means for producing signals indicative of radiation sensed thereby.

3. In apparatus of the class described: a support; a spherically shaped rotor universally supported by said support and adapted to be rotated about a spin axis; and means for measuring relative rotation between said rotor and said support about any axis at an angle to said spin axis, said measuring means comprising a plurality of latitude lines on said rotor, each of said lines having radiative portions and non-radiative portions and said radiative portions and non-radiative portions of said lines being arranged about said rotor so that each of said lines has a characteristic coding to permit the identification thereof, and a plurality of pickoff means orthogonally positioned on said support, each of said pickoff means being adapted to sense radiation from said rotor including means for producing signals indicative of radiation sensed thereby, and computer means connected to said pickoff signal producing means.

4. In apparatus of the class described: a support; a spherically shaped rotor universally supported by said support and adapted to be rotated about a spin axis; and means for measuring relative rotation between said rotor and said support about any axis at an angle to said spin axis, said measuring means comprising a plurality of latitude lines on said rotor, each of said lines having radiative portions and non-radiative portions and said radiative portions and non-radiative portions of said lines being arranged about said rotor so that each of said lines has a characteristic coding to permit the identification thereof, pickoff means adapted to sense radiation from said rotor including means for producing signals indicative of radiation sensed thereby, coarse readout means connected to said signal producing means, filter means, fine readout means, and means including said filter means connecting said fine readout means to said signal producing means.

5. Means for sensing relative latitude between a point on a support member and a substantially spherically shaped rotor member universally supported about a spin axis, said means comprising a plurality of coded latitude lines, having radiative portions and non-radiative portions, on said rotor and a radiation responsive pickoff mounted in radiative proximity with respect to said rotor.

6. Means for sensing relative latitude between a support member and a substantially spherically shaped rotor member universally supported on said support and adapted to spin relative to said support about a spin axis, said means comprising a plurality of coded latitude lines, having radiative portions and non-radiative portions, on said rotor and a plurality of radiation responsive pickoffs mounted on said support member in radiative proximity with respect to said rotor.

7. Means for sensing relative latitude between a point on a support member and a substantially spherically shaped rotor member universally supported on said support and adapted to spin relative to said support about a spin axis, said means comprising a plurality of coded latitude lines, having radiative portions and non-radiative portions, on said rotor and radiation responsive pickoff means mounted in radiative proximity with respect to said rotor, said pickoff means including means for producing a signal indicative of radiation sensed thereby.

8. Means for sensing relative latitude between a support member and a substantially spherically shaped rotor member universally supported on said support and adapted to spin relative to said support about a spin axis, said means comprising a plurality of coded latitude lines, having radiative portions and non-radiative portions, on said rotor, radiation responsive pickoff means mounted in radiative proximity with respect to said rotor and including means for producing a signal indicative of radiation sensed thereby, and computer means connected to said signal producing means.

9. Means for sensing relative latitude between a point on a support member and a substantially spherically shaped rotor member universally supported on said support and adapted to spin relative to said support about a spin axis, said means comprising a plurality of coded radiative latitude line portions on said rotor and radiation responsive pickoff means mounted in radiative proximity with respect to said rotor, said portions extending a substantial distance about said rotor member and said pickoff means including means for producing a signal indicative of radiation sensed thereby.

References Cited in the file of this patent

UNITED STATES PATENTS 2,959,060    Kunz ------------------ Nov. 8, 1960